(12) United States Patent
Shimazaki et al.

(10) Patent No.: US 8,678,207 B2
(45) Date of Patent: Mar. 25, 2014

(54) COUPLING MEMBER, AND ASSEMBLED RACK PROVIDED WITH SAME

(75) Inventors: Yukitomo Shimazaki, Tokyo (JP); Takashi Shinozaki, Tokyo (JP)

(73) Assignee: Kawajun Co., Ltd., Tokyo (JP)

( * ) Notice: Subject to any disclaimer, the term of this patent is extended or adjusted under 35 U.S.C. 154(b) by 2 days.

(21) Appl. No.: 13/576,454

(22) PCT Filed: Feb. 4, 2010

(86) PCT No.: PCT/JP2010/051621
§ 371 (c)(1),
(2), (4) Date: Oct. 12, 2012

(87) PCT Pub. No.: WO2011/096063
PCT Pub. Date: Aug. 11, 2011

(65) Prior Publication Data
US 2013/0026122 A1    Jan. 31, 2013

(51) Int. Cl.
*A47B 43/00* (2006.01)
*A47B 9/00* (2006.01)
*A47B 47/00* (2006.01)

(52) U.S. Cl.
USPC .................. 211/187; 211/208; 108/147.13

(58) Field of Classification Search
USPC ................... 211/186, 187, 208, 182
See application file for complete search history.

(56) References Cited

U.S. PATENT DOCUMENTS 3,523,508 A * 8/1970 Maslow ............... 108/147.13
4,582,001 A * 4/1986 Leikarts ................... 108/106
4,656,952 A * 4/1987 Schweizer ................ 108/11
4,750,626 A * 6/1988 Nicely ..................... 211/187
5,174,200 A * 12/1992 Jeandel et al. ............ 108/187

(Continued)

FOREIGN PATENT DOCUMENTS

JP    57-196803 U    12/1982
JP     3054076 U     9/1998

(Continued)

OTHER PUBLICATIONS

International Search Report for PCT/JP2010/051621, mailing date of Apr. 6, 2010.

(Continued)

*Primary Examiner* — Jonathan Liu
*Assistant Examiner* — James Twomey
(74) *Attorney, Agent, or Firm* — Westerman, Hattori, Daniels & Adrian, LLP

(57) ABSTRACT

A coupling member includes two members that are fitted to each other to hold a post from either side, each of the two members including a first tapered section that gradually increases in diameter in a downward direction, and a second tapered section that gradually slopes inward in the downward direction, and the first tapered section of one member among the two members and the second tapered section of another member among the two members being disposed within the half area of the coupling member in the diametrical direction when viewed from the front side when the coupling member is fitted to the post. An assembly shelf includes the coupling member. Since the assembly shelf is configured so that one shelf board member is supported within the half area of the coupling member in the diametrical direction when viewed from the front side, the assembly shelf can be easily assembled, and a middle shelf board member can be removed from the assembly shelf.

19 Claims, 14 Drawing Sheets

(56) References Cited

U.S. PATENT DOCUMENTS

| | | | | |
|---|---|---|---|---|
| 6,044,988 | A * | 4/2000 | Yang | 211/187 |
| 6,068,143 | A * | 5/2000 | Wang | 211/187 |
| 6,257,426 | B1 * | 7/2001 | Masunaka et al. | 211/187 |
| 6,364,138 | B1 * | 4/2002 | Chen | 211/187 |
| 7,093,728 | B2 * | 8/2006 | Chen | 211/187 |
| 2008/0076304 | A1 | 3/2008 | Tatematsu | |
| 2010/0155352 | A1 * | 6/2010 | Hsieh | 211/134 |
| 2011/0056899 | A1 * | 3/2011 | Shinozaki | 211/153 |

FOREIGN PATENT DOCUMENTS

| | | |
|---|---|---|
| JP | 3057990 U | 6/1999 |
| JP | 2001-292837 A | 10/2001 |
| JP | 2002-058546 A | 2/2002 |
| JP | 3104160 U | 9/2004 |
| JP | 3149658 U | 4/2009 |
| WO | 2006/115109 A1 | 11/2006 |

OTHER PUBLICATIONS

European Search Report dated May 22, 2013, issued in corresponding European Patent Application No. 10845199.8 (4 pages).

* cited by examiner a.)

(A)

b.)

COUPLING MEMBER, AND ASSEMBLED RACK PROVIDED WITH SAME

TECHNICAL FIELD

The invention relates to an assembly shelf that may be used as a storage shelf in an office, home, warehouse, store, and the like, or may be used as a display shelf in a store, and implements easy assembly and disassembly, and a coupling member used for the assembly shelf.

BACKGROUND ART

Publication of Registered Japanese Utility Model Application No. 3057990 discloses a shelf board locking structure that includes a post having a plurality of annular locking grooves that are formed in the outer circumferential surface in the longitudinal direction at given intervals, a tapered sleeve that is attached to the outer circumferential surface of the post in a state in which a protrusion formed on the inner circumferential surface is fitted into the locking groove of the post, and is formed so that the outer diameter gradually increases in the downward direction, and a shelf board that has an inner surface shape that gradually increases in diameter in the downward direction to approximately coincide with part or the entirety of the outer surface shape of the tapered sleeve, and has a ring that is provided at each corner and is disposed around the outer circumferential surface of the tapered sleeve that is attached to the outer circumferential surface of the post, wherein the right and left rings of the shelf board differ in height, and are alternately disposed around the outer circumferential surface of the tapered sleeve, and right and left shelf boards can be coupled by utilizing a single post.

According to such an assembly shelf, a single post can be used to couple two shelf board members in the longitudinal direction. This improves the design, and facilitates assembly.

RELATED-ART DOCUMENT

Patent Document

Patent Document 1: Publication of Registered Japanese Utility Model Application No. 3057990

SUMMARY OF THE INVENTION

Technical Problem

According to the above assembly shelf, however, when it is desired to change the position of a middle shelf board member of a multi-stage assembly (hereinafter may be referred to as "middle shelf board removal operation"), it is necessary to remove the shelf board member that is positioned above the middle shelf board member. Therefore, the middle shelf board removal operation is inconvenient to the user although assembly is easy.

Accordingly, an object of the invention is to provide an assembly shelf that can be easily assembled, and allows the position of a middle shelf board member of a multi-stage assembly to be changed by merely removing and resetting the middle shelf board member, and a coupling member used for the assembly shelf.

Solution to Problem

The invention was conceived to solve the above problem. According to one aspect of the invention, a coupling member that is fitted to a post, and supports one shelf board member within a half area of the coupling member in a diametrical direction when viewed from a front side, includes: two members that are fitted to each other to hold the post from either side, each of the two members including a first tapered section that gradually increases in diameter in a downward direction, and a second tapered section that gradually slopes inward in the downward direction, and the first tapered section of one member among the two members and the second tapered section of another member among the two members being disposed within the half area of the coupling member in the diametrical direction when viewed from the front side when the coupling member is fitted to the post.

According to another aspect of the invention, an assembly shelf includes the coupling member.

Advantageous Effects of the Invention

The assembly shelf can be easily assembled, and allows the position of a middle shelf board member of a multi-stage assembly to be changed by merely removing and resetting the middle shelf board member.

DESCRIPTION OF EMBODIMENTS

A coupling member according to a first embodiment of the invention and a shelf board member that is attached using the same are described below with reference to FIGS. 1 to 18. A coupling member 1 is fitted to a post 2, and supports one shelf board member 31 within the half area of the coupling member 1 in the diametrical direction when viewed from the front side (i.e., within an area indicated by X/2 in FIG. 15 (X indicates the dimension of the coupling member 1 in the transverse direction (see FIGS. 15 and 16)). Since the coupling member 1 supports one shelf board member 31 within the half area of the coupling member 1 in the diametrical direction when viewed from the front side, the position of a middle shelf board member of an assembly shelf that includes a plurality of shelf board members arranged in the vertical direction can be changed (i.e., the middle shelf board member can be removed) without removing the other shelf board members. Moreover, another shelf board member can be coupled directly to the assembly shelf in the transverse direction.

Figure 2:
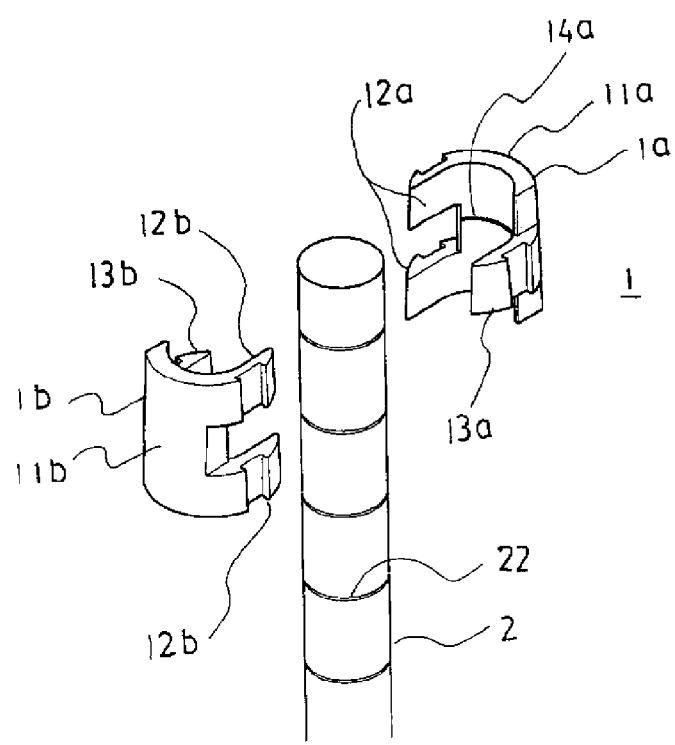
FIG. 2 is a perspective view illustrating a state in which the coupling member illustrated in FIG. 1 is separated.
Figure 3:
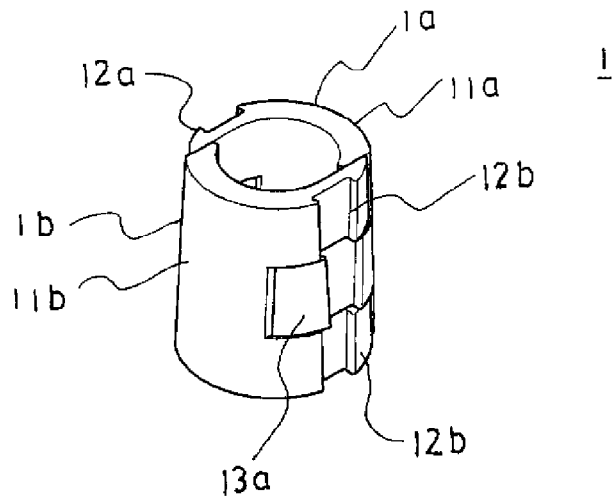
FIG. 3 is an enlarged perspective view illustrating the coupling member illustrated in FIG. 1.
Figure 4:
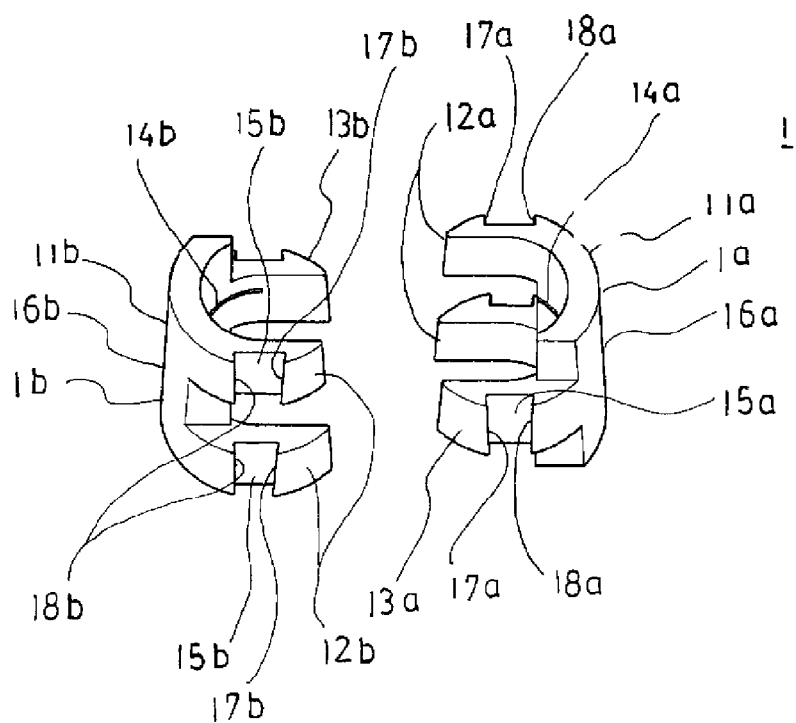
FIG. 4 is a perspective view illustrating two members of the coupling member illustrated in FIG. 1.
Figure 5:
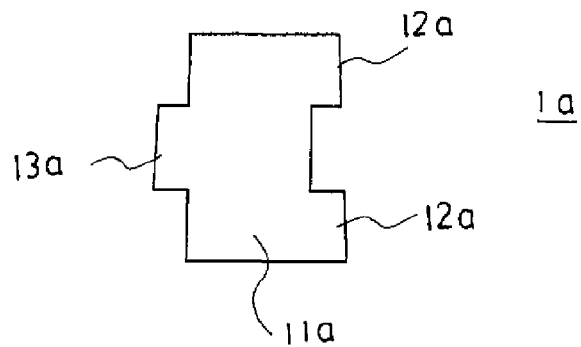
FIG. 5 is a right side view illustrating the right member illustrated in FIG. 4.
Figure 6:
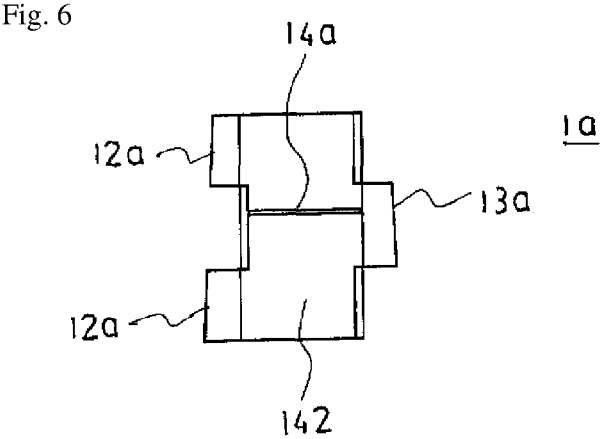
FIG. 6 is a left side view illustrating the right member illustrated in FIG. 4.

As illustrated in FIGS. 2 and 4, the coupling member 1 includes two members 1a and 1b that are fitted to each other to hold the post 2 from either side, each of the members 1a and 1b including a first tapered section 16a (16b) that gradually increases in diameter in the downward direction, and a second tapered section 17a (17b) that gradually slopes inward in the downward direction, and the first tapered section 16a of the member 1a (one member) and the second tapered section 17b of the member 1b (the other member) being disposed within the half area (X/2 in FIG. 15) of the coupling member 1 in the diametrical direction when viewed from the front side when the coupling member 1 is fitted to the post 2. The diametrical direction of the coupling member 1 when viewed from the front side refers to the diametrical direction that extends in the transverse direction when viewed from the front side. When the coupling member 1 is fitted to the post 2, the first tapered section 16b of the member 1b and the second tapered section 17a of the member 1a are disposed within the other half area of the coupling member 1 in the diametrical direction when viewed from the front side. Since the tapered sections of the member 1a and the member 1b are disposed within the half area of the coupling member 1 in the diametrical direction when viewed from the front side, it is possible to remove a middle shelf board member. Note that sign a is assigned to one member, and sign b is assigned to the other member.

The first tapered section 16a (16b) gradually increases in diameter with respect to the axial center of the post 2 when the coupling member 1 is fitted to the post 2. Therefore, the expression "the first tapered section 16a (16b) gradually increases in diameter" means that the first tapered section 16a (16b) slopes so that the first tapered section 16a (16b) is positioned away from the axial center of the post 2 in the downward direction. The second tapered section 17a (17b) gradually slopes inward with respect to the axial center of the post 2 when viewed from the front side when the coupling member 1 is fitted to the post 2. Therefore, the expression "the second tapered section 17a (17b) gradually slopes inward" means that the second tapered section 17a (17b) slopes so that the second tapered section 17a (17b) is positioned closer to the axial center of the post 2 in the downward direction when viewed from the front side (i.e., the second tapered section 17a (17b) slopes to diagonally intersect the transverse direction when viewed from the front side). The term "front side" used herein refers to the side indicated by F in FIG. 16, of which the transverse direction is parallel to the shelf board member coupling direction. Note that the shelf board member coupling direction normally corresponds to the longitudinal direction of the shelf board member, but does not necessarily correspond to the longitudinal direction of the shelf board member. An acute angle is formed by the wall where the second tapered section 17a (17b) is formed in a plan view (see FIG. 7). This prevents a situation in which a flange 32 of a third engagement section 3 comes off from the second tapered section 17a (17b).

The two members (i.e., the member 1a and the member 1b) that form the coupling member 1 may have an identical shape and identical dimensions. In the first embodiment, the member 1a and the member 1b have an identical shape and identical dimensions (i.e., the member 1a is vertically rotated by 180 degrees when used as the member 1b, and vice versa). When the member 1a and the member 1b have an identical shape and identical dimensions, it suffices to use one mold when producing the member 1a and the member 1b, so that the production cost can be reduced. Note that the same description applies to the member 1a and the member 1b.

Each of the member 1a and the member 1b of the coupling member includes a main body 11a (11b) that has an inner circumferential surface 142 (143) having a shape that corresponds to the shape of the side surface of the post 2, and arm sections 12a and 13a (12b and 13b) that extend from either side of the main body 11a (11b) in the diametrical direction (internal direction) of the post 2. As illustrated in FIGS. 3 to 10, the member 1a includes the main body 11a that has the concave inner circumferential surface 142 having a shape that corresponds to the shape of the side surface of the post 2, two arm sections 12a that are spaced apart from each other in the vertical direction, and extend from one side (i.e., the back side when viewed from the front side) of the main body 11a in the diametrical direction of the post 2, and one arm section 13a that extends from the center area (in the vertical direction) of the other side (i.e., the front side when viewed from the front side) of the main body 11a in the diametrical direction of the post 2. The member 1b includes the main body 11b that has the concave inner circumferential surface 143 having a shape that corresponds to the shape of the side surface of the post 2, one arm section 13b that extends from the center area (in the vertical direction) of one side (i.e., the back side when viewed from the front side) of the main body 11b in the diametrical direction of the post 2, and two arm sections 12b that are spaced in the vertical direction, and extend from the other side (i.e., the front side when viewed from the front side) of the main body 11b in the diametrical direction of the post 2.

When the coupling member 1 is fitted to the post 2, the arm section 13b of the member 1b is positioned between the two arm sections 12a of the member 1a, and the arm section 13a of the member 1a is positioned between the two arm sections 12b of the member 1b. Specifically, the arm sections of the one member and the arm sections of the other member are alternately disposed when the coupling member 1 is fitted to the post 2.

The main body 11a (11b) includes the first tapered section 16a (16b) that is in the shape of a concave plate that has a given height and a given width, and has an outer circumferential surface that has a given width and a given height and increases in diameter in the downward direction. The given width is not particularly limited, but may be almost equal to the diameter of the post 2 when viewed from the side. This makes it possible to maintain strength, and firmly fit the coupling member 1 to the post 2. A sufficient tightening force can be obtained by setting the taper angle of the first tapered section 16a (16b) to about 2 to 3 degrees.

An elongated protrusion 14a (14b) or a protrusion that engages the post 2 is formed on the inner circumferential surface 142 (143) of the main body 11a (11b). The elongated protrusion 14a (14b) is an annular protrusion that is (partially) formed on the inner circumferential surface 142 (143) along the widthwise direction, and engages an annular or partially annular locking groove 22 of the post 2. The vertical movement of the coupling member 1 can be prevented by causing the elongated protrusion 14a (14b) to engage the locking groove 22. The protrusion may engage a locking hole (not illustrated in the drawings) formed in the post 2. The locking hole is a hole having a bottom.

The arm sections 12a and 13a (12b and 13b) form the second tapered section 17a (17b). Since the arm sections 12a and 13a (12b and 13b) are formed so that the end of the arm sections 12a and 13a (12b and 13b) extend beyond the center of the post 2 when viewed from the front side when the coupling member 1 is fitted to the post 2, the second tapered section 17a (17b) can be formed within the other half area of the coupling member 1 in the diametrical direction.

Figure 7:
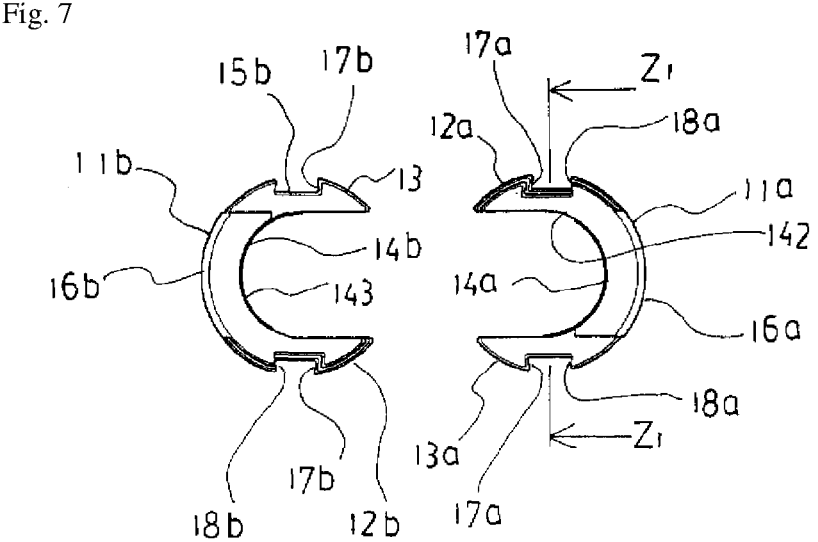
FIG. 7 is a plan view illustrating two members of the coupling member illustrated in FIG. 4.
Figure 8:
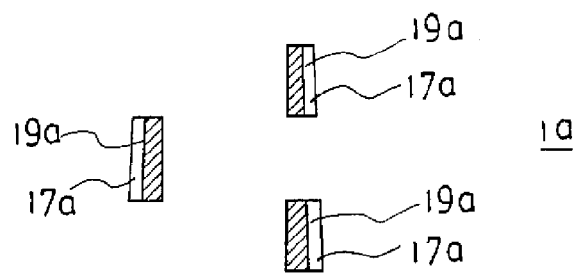
FIG. 8 is a view taken along $Z_1$-$Z_1$ in FIG. 7.

As illustrated in FIG. 4, the second tapered section 17a (17b) of the member 1a (1b) has a rectangular planar surface that has a given length and a given width, and is observed when viewed from the front side. As illustrated in FIG. 7, the second tapered section 17a (17b) is a wall that is formed opposite to the main body by removing a center area (in the lengthwise direction) of a plate-shaped body (arm section) having a given thickness in the thickness direction. A sufficient tightening force can be obtained by setting the taper angle of the second tapered section 17a (17b) to about 2 to 3 degrees.

Note that a wall 18a (18b) formed on the side of the main body 11a (11b) by removing the center area (in the lengthwise direction) of the plate-shaped body having a given thickness in the thickness direction is positioned on the side of the main body relative to the second tapered section 17b of the other member when the coupling member 1 is fitted to the post 2. According to this structure, when the coupling member 1 is fitted to the post 2, and the third engagement section 3 of the shelf board member 31 is fitted to the coupling member 1, only the first tapered section 16a of the member 1a and the second tapered section 17b of the member 1b come in contact with the third engagement section 3, and the wall 18a (18b) does not hinder assembly.

Figure 9:
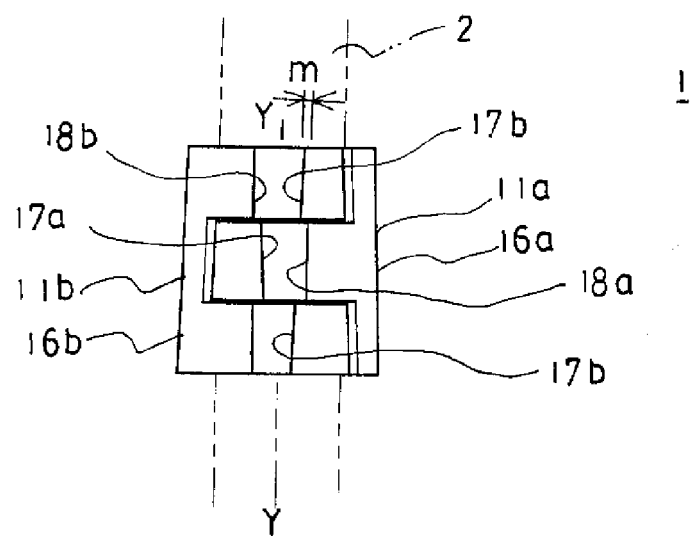
FIG. 9 is a front view illustrating the coupling member illustrated in FIG. 1.
Figure 10:
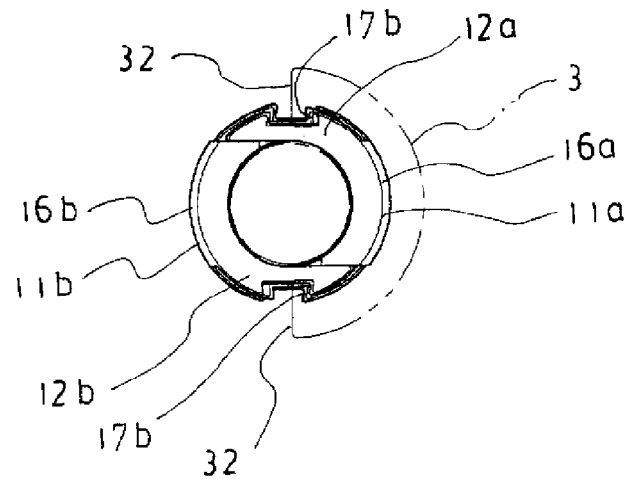
FIG. 10 is a plan view illustrating the coupling member illustrated in FIG. 1.

As illustrated in FIG. 9, the first tapered section 16a that slopes outward in the downward direction, and the second tapered sections 17b that slope inward in the downward direction are observed on the right side of the axial center of the post 2 when viewed from the front side when the coupling member 1 is fitted to the post 2. Since the second tapered sections 17b that are observed when viewed from the front side are respectively formed on the arm sections that are spaced apart from each other in the vertical direction, the second tapered sections 17b are spaced apart from each other, but form a continuous tapered shape. The second tapered section 17b that is observed from the back side is formed on the center arm section. The wall 18a that is observed between the second tapered sections 17b when viewed from the front side is formed on the one member, and does not form a continuous tapered shape with the second tapered sections 17b (i.e., forms a difference in level). The difference in level between the second tapered sections 17b and the wall 18a is an allowance m (see FIG. 9) that makes it possible to allow the members 1a and 1b to firmly hold the post 2. When the allowance m is zero, the effect of allowing the members 1a and 1b to firmly hold the post 2 significantly decreases.

A recess 15a (15b) of the arm sections 12a and 13a (12b and 13b) that is positioned between the second tapered section 17a (17b) and the wall 18a (18b) is a fifth tapered section that gradually slopes outward in the downward direction. The fifth tapered section corresponds to a sixth tapered section of the third engagement section 3 of the shelf board member 31. Therefore, the coupling member 1 can be firmly fitted to the post 2 by fitting the third engagement section 3 to the coupling member 1. A sufficient tightening force can be obtained by setting the taper angle of the fifth tapered section 15a (15b) to about 2 to 3 degrees.

The coupling member 1 is formed of a metal, a resin, or a composite thereof. It is preferable that the coupling member 1 be formed of a resin since metal noise or the like does not occur during assembly, and assembly is facilitated. An engineering plastic (e.g., polyacetal resin, polyamide resin, acrylonitrile-butadiene-styrene copolymer resin (ABS resin), epoxy resin, phenol resin, or polycarbonate resin) may be used as the resin. These synthetic resins exhibit excellent impact resistance, abrasion resistance, and chemical resistance. The resin may include reinforcing fibers such as glass fibers or carbon fibers.

An assembly shelf according to the first embodiment is described below. An assembly shelf 10 according to the first embodiment includes the coupling member 1 that includes the two members. The assembly shelf 10 includes the post 2, the coupling member 1, and the shelf board member 31. One shelf board member 31 is secured on four posts 2 using four coupling members 1. The three-stage assembly shelf 10 illustrated in FIG. 16 includes three shelf board members 31, four posts 2, and twelve coupling members 1. Note that the twelve coupling members 1 utilize twelve pairs of members (i.e., twenty-four members).

The assembly shelf 10 according to the first embodiment includes four posts 2 on which the coupling member 1 is secured, and the shelf board member 31 that includes the third engagement sections 3 that are respectively formed at the four corners of the shelf board member 31, each of the third engagement sections 3 including a third tapered section 33 that comes in contact with the first tapered section 16a (16b) of the member 1a of the coupling member 1, a fourth tapered section 32 that comes in contact with the second tapered sections 17b of the member 1b of the coupling member 1, and a sixth tapered section 36 that comes in contact with the fifth tapered section 15a (15b) formed on the arm sections 12a (12b) and 13a (13b) of the coupling member 1, the shelf board member 31 being secured by fitting each third engagement section 3 to each coupling member 1, and the shelf board member 31 being disposed between the axial center of one post 2 among the four posts 2 and the axial center of another post 2 among the four posts 2 when viewed from the front side. Note that the fifth tapered section 15a (15b) of the coupling member 1 and the sixth tapered section 36 of the third engagement section 3 are optional elements.

A plurality of annular or partially annular locking grooves may be formed in the post 2 in the longitudinal direction at regular or irregular intervals. The cross-sectional shape of the post 2 is not particularly limited. The post 2 may have a circular cross-sectional shape, an elliptical cross-sectional shape, a quadrangular cross-sectional shape, a rhombic cross-sectional shape, a cross-sectional shape in the shape of the letter "X", a cross-sectional shape in the shape of the letter "H", or the like. The partially annular locking groove may be a groove that is linearly formed in the outer circumferential surface of the post 2 so that the depth of the groove increases at the center of the groove, and decreases toward the edge (end) of the groove.

The shelf board member 31 has a configuration in which the third engagement section 3 that engages the coupling member 1 is formed at each (approximate) corner. The term "each corner" refers to each end of the shelf board member 32 in the lateral direction. This makes it possible to install the assembly shelf 10 in a stable manner due to an increase in installation area formed by the four posts. The main part of the shelf board member may have a board-like structure or a net-like structure. The shelf board member 31 normally has a rectangular shape in a plane view.

Figure 11:
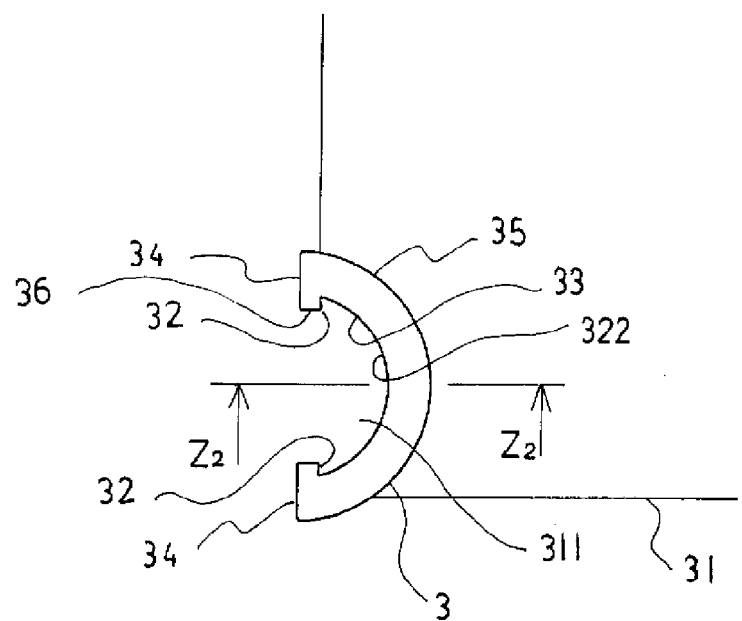
FIG. 11 is a plan view illustrating a third engagement section that is formed at each corner of a shelf board member illustrated in FIG. 1.
Figure 12:
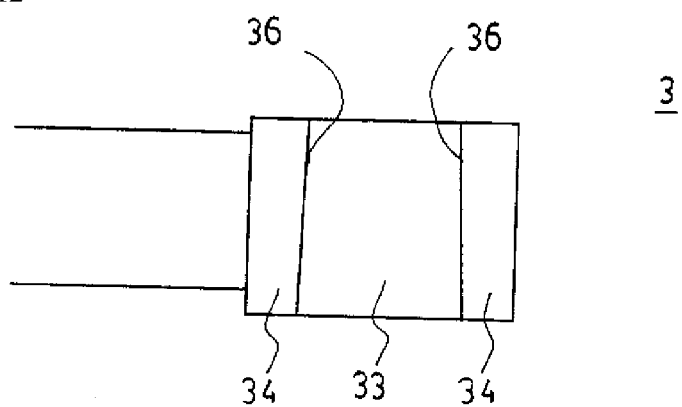
FIG. 12 is a left side view illustrating a third engagement section that is formed at each corner of a shelf board member illustrated in FIG. 1.
Figure 13:
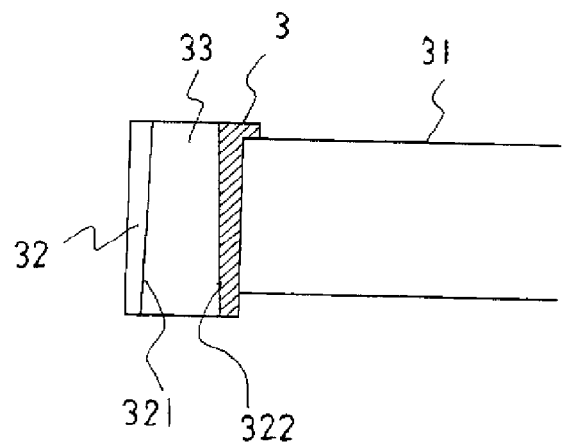
FIG. 13 is a view taken along $Z_2$-$Z_2$ in FIG. 9.
Figure 14:
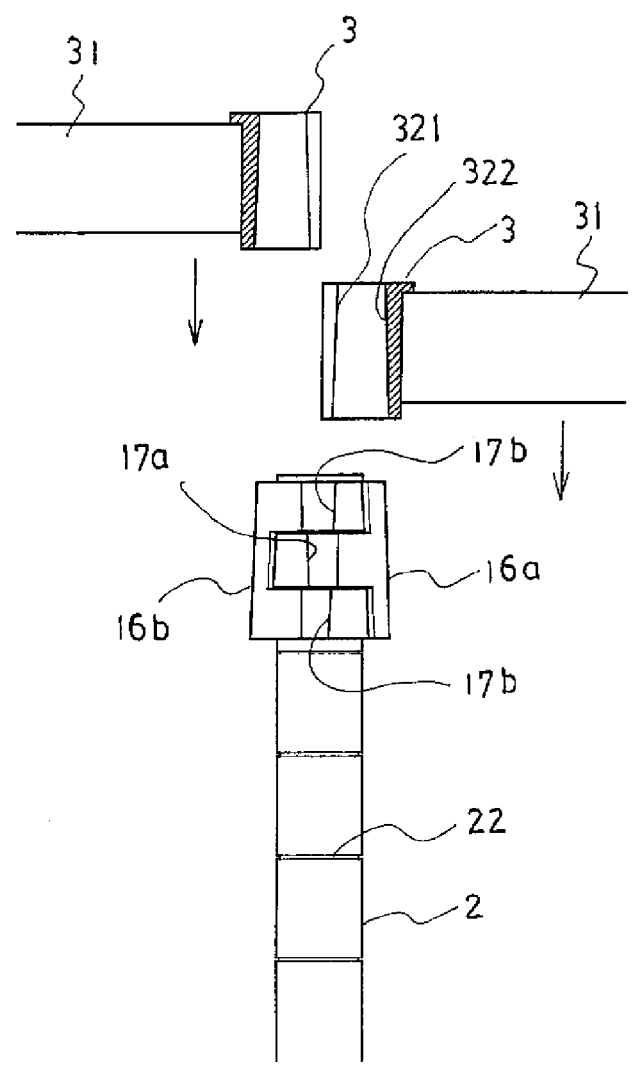
FIG. 14 is a cross-sectional view (taken along $Z_2$-$Z_2$) illustrating a third engagement section when viewing the coupling section from the front side.

As illustrated in FIGS. 11 to 13, the third engagement section 3 of the shelf board member 31 includes an engagement main body 35 that has an inner circumferential surface having a shape that corresponds to the shape of the side surface of the coupling member 1, and a flange 34 that extends inward from each end of the engagement main body 35. The third tapered section 322 is formed on the inner circumferential surface (inner wall surface) 33 of a hollow section 311, and a fourth tapered section 321 is formed on a side 32 of the flange 34 that faces the third tapered section. As illustrated in FIGS. 11 and 13, the fourth tapered section 321 is observed when viewed from the front side ($Z_2$-$Z_2$ in FIG. 11), and has a shape that corresponds to the shape of the second tapered section 17a (17b) of the coupling member 1. The third tapered section 322 has a shape that corresponds to the shape of the first tapered section 16a (16b) of the coupling member 1 (i.e., a recess that increases in diameter in the downward direction in one embodiment).

An inner side surface 36 of the flange 34 forms a tapered section (sixth tapered section) that gradually slopes outward in the downward direction. The sixth tapered section 36 corresponds to the fifth tapered section 15a (15b) of the coupling member 1. Since the sixth tapered section strongly presses the arm sections 12a and 13a (12b and 13b) of the coupling member 1 against the post 2 by fitting the third engagement section 3 to the coupling member 1, the coupling member 1 can be firmly fitted to the post 2. A sufficient tightening force can be obtained by setting the taper angle of the sixth tapered section 36 to about 2 to 3 degrees.

An acute angle is formed by the flange 34 on the side of the third tapered section in a plane view. Therefore, removal of the third engagement section 3 can be prevented due to engagement with the wall (second tapered section 17a (17b)) that also forms an acute angle.

An example of a method that secures the shelf board member 31 on the posts 2 is described below. A lowermost shelf board member 31b is secured on the posts 2 via the coupling members 1. More specifically, the coupling member 1 is attached to the post 2 at a given position in the height direction. When attaching the coupling member 1, the two members are fitted to the post 2 to hold the post 2 from either side. The two members are fitted to the post 2 so that the elongated protrusion 14a (14b) of the coupling member 1 is fitted into the locking groove 22 of the post 2. The vertical movement of the coupling member 1 is prevented by fitting the elongated protrusion 14a (14b) of the coupling member 1 into the locking groove 22 of the post 2. The coupling member 1 is attached to each post 2. Next, each third engagement section 3 of the shelf board member 31b is fitted to each coupling member 1 from above (FIG. 15A). The third tapered section 322 of the shelf board member 31 comes in contact with the first tapered section 16a of the member 1a of the coupling member 1, and presses the member 1a against the post 2 (direction A in FIG. 15A), and the fourth tapered section 321 of the shelf board member 31 comes in contact with the second tapered section 17b of the member 1b of the coupling member 1, and presses the member 1b against the member 1a (direction B in FIG. 15A), so that the two members of the coupling member 1 hold the post 2 (FIG. 15B). Specifically, the shelf board member 31 does not come in contact with the post 2, and is supported by the coupling member 1. The coupling member 1 is firmly secured on the post 2 by fitting the third engagement section 3 of the shelf board member 31 to the coupling member 1 in the downward direction. A middle shelf member 31a and an uppermost shelf board member 31 are then secured on the posts 2. The middle shelf member 31a and the uppermost shelf board member 31 may be secured in an arbitrary order. Specifically, the uppermost shelf board member 31 may be secured after securing the middle shelf member 31a, or the middle shelf member 31a may be secured after securing the uppermost shelf board member 31. A related-art assembly shelf does not allow the middle shelf member 31a to be secured after securing the uppermost shelf board member 31. In contrast, the assembly shelf according to the first embodiment allows the middle shelf member 31a to be secured after securing the uppermost shelf board member 31. This enhances the degree of freedom of the working process, and facilitates the assembly work.

Figure 15:
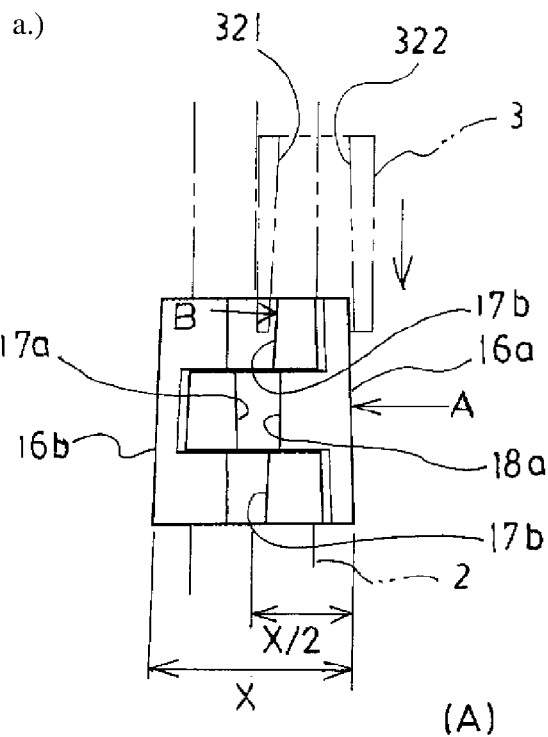
FIGS. 15A and 15B are views illustrating the advantageous effects of a coupling member.
Figure 15:
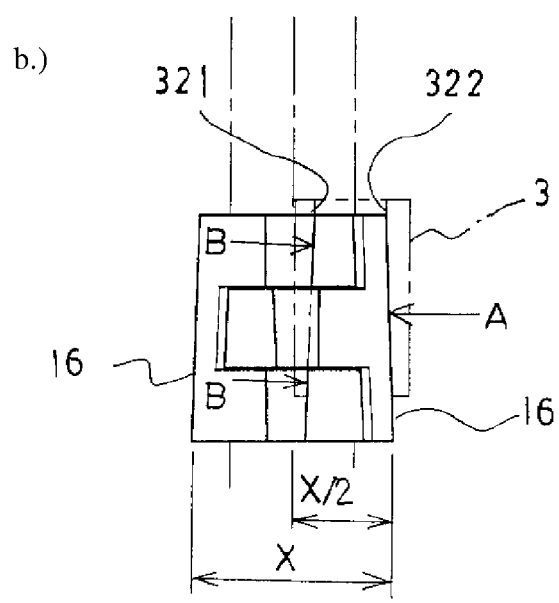
Figure 16:
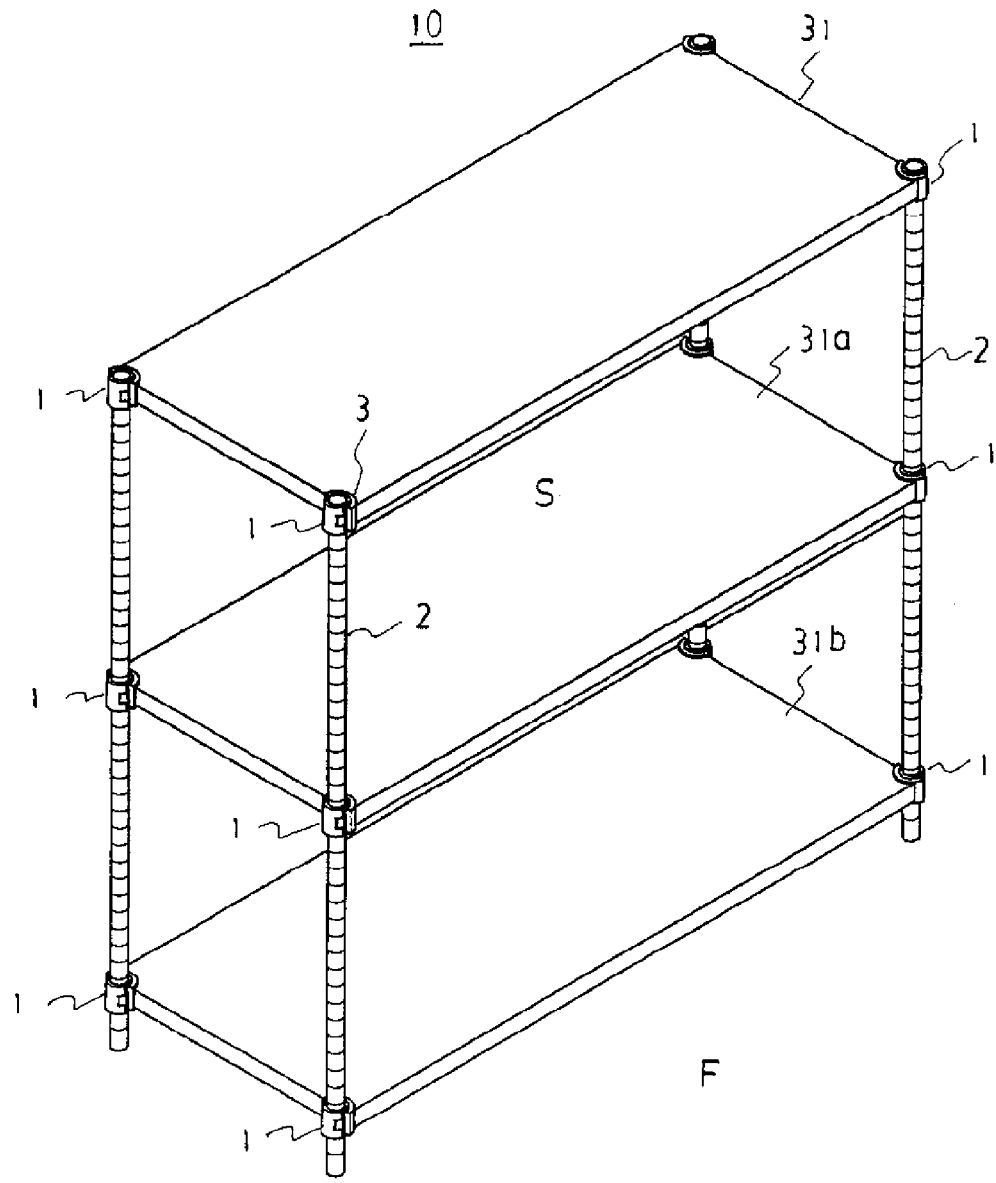
FIG. 16 is a perspective view illustrating an assembly shelf according to one embodiment of the invention.
Figure 25:
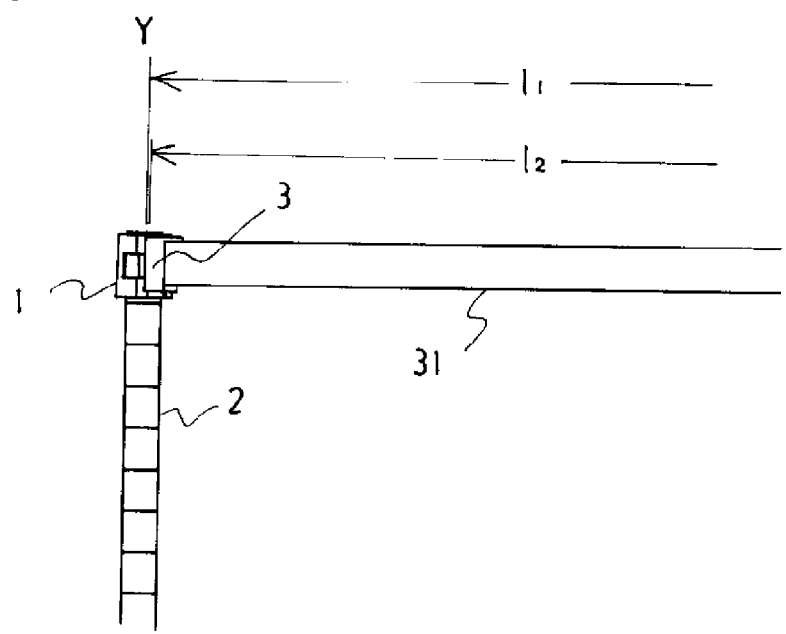
FIG. 25 is an enlarged front view illustrating a coupling member of an assembly shelf.
Figure 26:
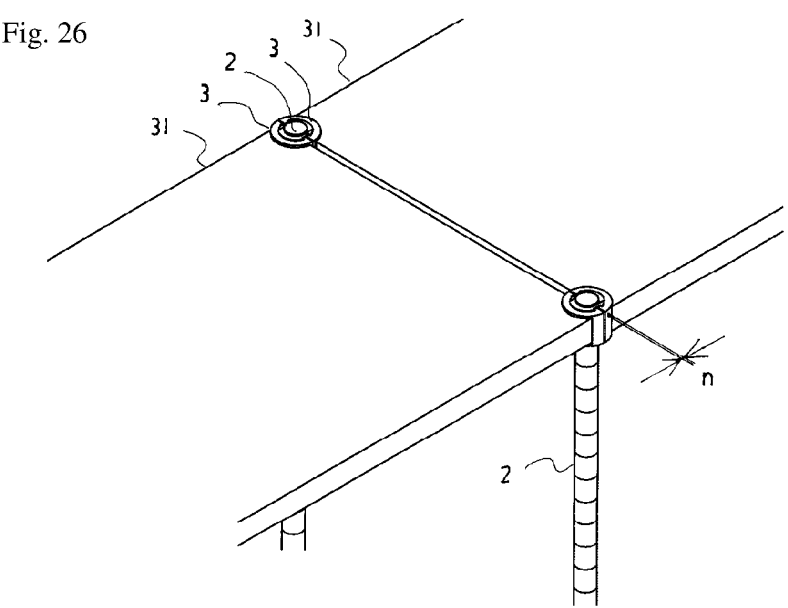
FIG. 26 is an enlarged perspective view illustrating part of coupled assembly shelves.

When the assembly shelf 10 illustrated in FIG. 16 is referred to as an assembly shelf unit (normally a multi-stage assembly shelf unit), the shelf board member 31 is disposed between the axial center of one post 2 among the four posts 2 and the axial center of another post 2 among the four posts 2 when viewed from the front side (see FIGS. 15 and 16). As illustrated in FIG. 25, the length ($l_2$) of one side of the shelf board member 31 when viewed from the front side is equal to or slightly less than the distance ($l_1$) between the axial center Y of the left post 2 and the axial center Y of the right post 2. Specifically, the shelf board member 31 is supported within the half area of the coupling member 1 in the diametrical direction when viewed from the front side. When the length ($l_2$) of one side of the shelf board member 31 when viewed from the front side is slightly less than the distance ($l_1$) between the axial center Y of the left post 2 and the axial center Y of the right post 2 (see FIG. 25), the end of the shelf board member 31 does not come in contact with the end of another shelf board member 31 when coupling two assembly shelves 10, so that the assembly shelves 10 can be easily coupled (assembled). The end-to-end distance between two coupled shelf board members 31 (i.e., a value twice the distance between the axial center of the post 2 and the end face of the shelf board member 31) (n in FIG. 26) is preferably set to 5 mm or less, and more preferably 2 mm or less in order to prevent a situation in which small articles placed on the shelf board member 31 fall off from the shelf board member 31. In the first embodiment, the end of the shelf board member 31 refers to the end of the third engagement section 3. Therefore, each end of the shelf board member 31 is not positioned outside the axial center of each post 2 when viewed from the front side. Note that the axial center Y refers to the center of the post 2 that extends in the vertical direction when viewed from the front side.

Each end of the shelf board member 31 is disposed within the half area of the coupling member 1 in the diametrical direction when viewed from the front side. When coupling two assembly shelves 10 in the longitudinal direction, the right and left shelf board members 31 can be secured on a single post 2 (see FIGS. 14 and 17) by thus utilizing the half area of the post 2 (i.e., the half area of the coupling member 1) for securing one shelf board member 31.

Figure 17:
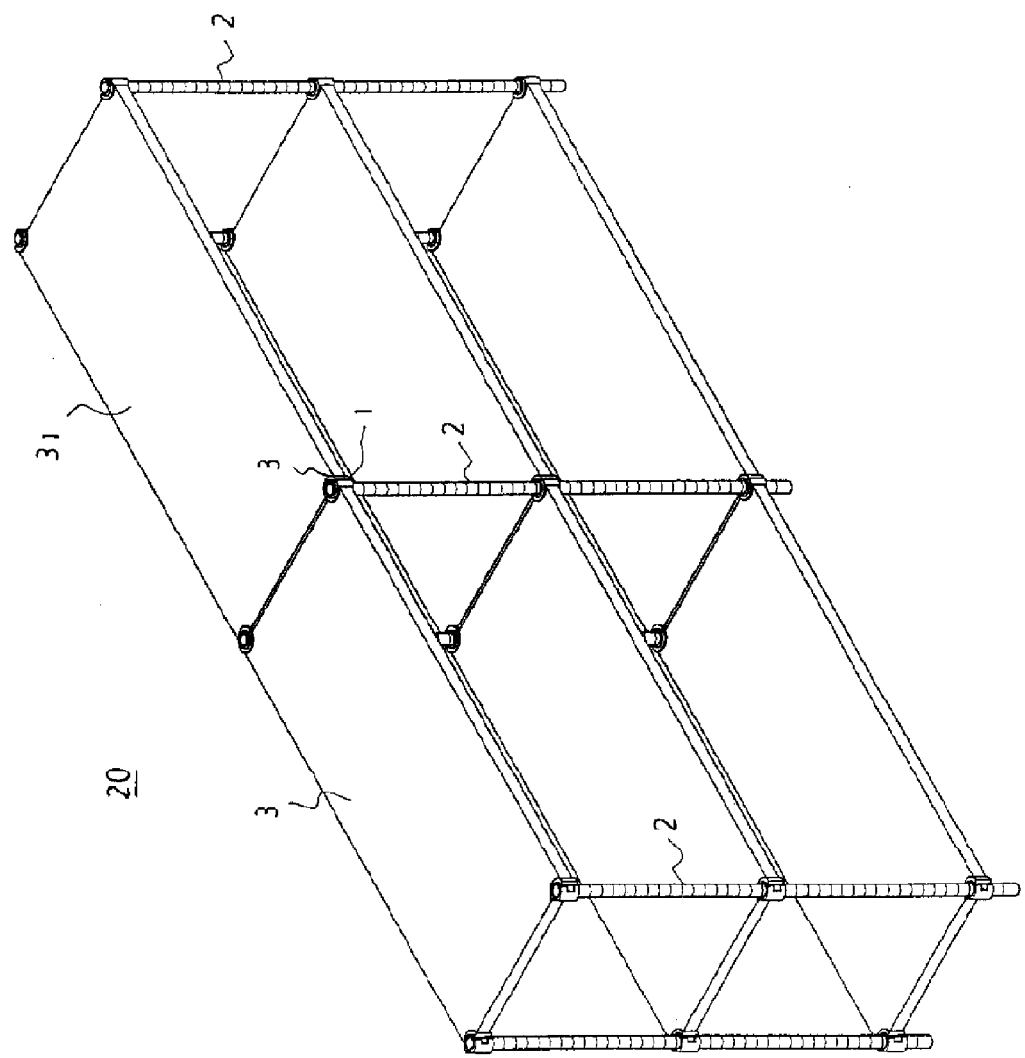
FIG. 17 is a perspective view illustrating another assembly shelf according to one embodiment of the invention.

The shelf board members 31 are coupled in the horizontal direction (see FIG. 17) as described below. Specifically, the third engagement section 3 of another shelf board member that is coupled to the assembly shelf 10 in the longitudinal direction is fitted within the other half area of the coupling member 1 in the diametrical direction when viewed from the front side to couple two shelf board members 31 via a single post 2. An assembly shelf 20 is thus obtained. As illustrated in FIG. 17, the assembly shelf 20 is a double assembly shelf in which the shelf board members 31 are provided on either side of a single post 2. The assembly shelf 20 differs from the assembly shelf 10 as to the usage of the middle post 2. As illustrated in FIGS. 16 and 17, the coupling target shelf board member 3 is secured within the other half area of the coupling member 1 in the diametrical direction. The shelf board members 31 additionally used for the assembly shelf 20 and their installation method are the same as those described above in connection with the assembly shelf 10.

Figure 18:
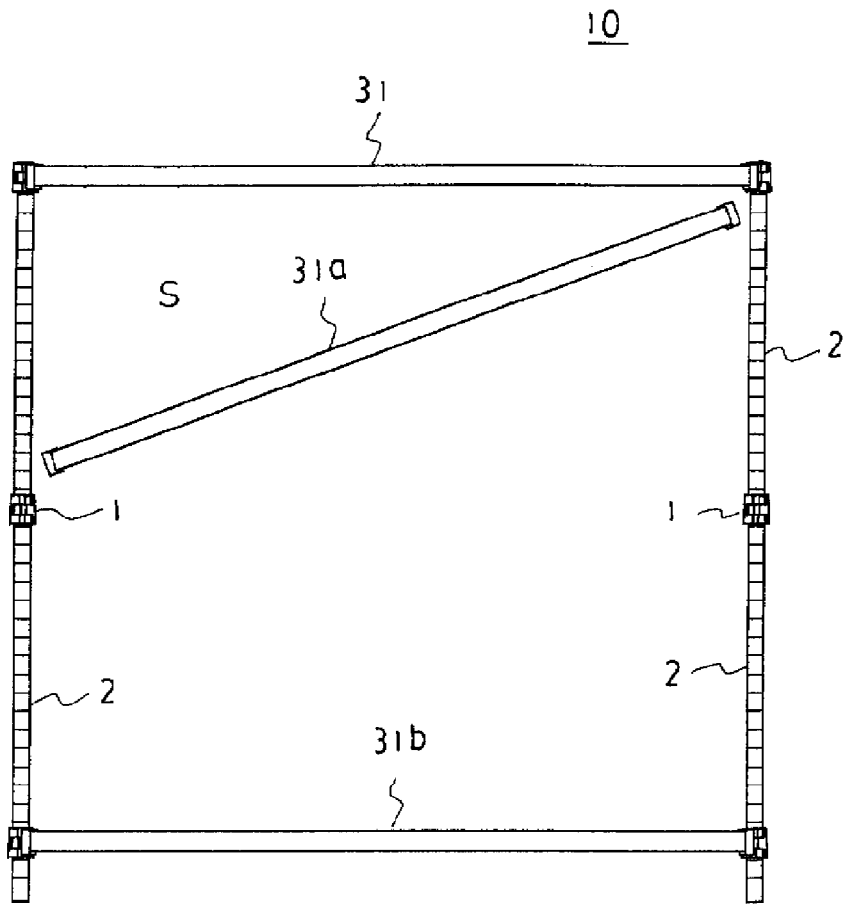
FIG. 18 is a view illustrating a middle shelf board removal operation.

A case of removing the middle shelf board member 31a of the assembly shelf 10 or 20, or changing the position of the middle shelf board member 31a (i.e., middle shelf board removal operation) is described below with reference to FIGS. 16, and 18. When removing the middle shelf board member 31a illustrated in FIG. 16, the middle shelf board member 31a is moved upward to some extent. An obstacle that may hinder the movement of the middle shelf board member 31a is not present in a space S above the middle shelf board member 3b, and a sufficient clearance is present between the post 2 and the third engagement section 3 of the shelf board, member 31a at a position where the coupling member 1 is not secured on the post 2. When the middle shelf board member 31a has been moved upward to some extent, the middle shelf board member 31a is tilted along the longitudinal direction (see FIG. 18). The middle shelf board member 31a is tilted so that the horizontal dimension of the tilted middle shelf board member 31a is smaller than the distance between the posts 2 of the assembly shelf 10. The tilted middle shelf board member 31a is then moved forward from the assembly shelf 10. The middle shelf board member 31a can thus be removed. After removing the middle shelf board member 31a, the coupling member 1 may be secured at a different position, and the middle shelf board member 31a may be secured again. The position of the middle shelf board member 31a can thus be changed.

The middle shelf board member 31a can be secured again by performing the above steps in the reverse order. The assembly shelves 10 and 20 thus enable an easy middle shelf board removal operation.

Figure 1:
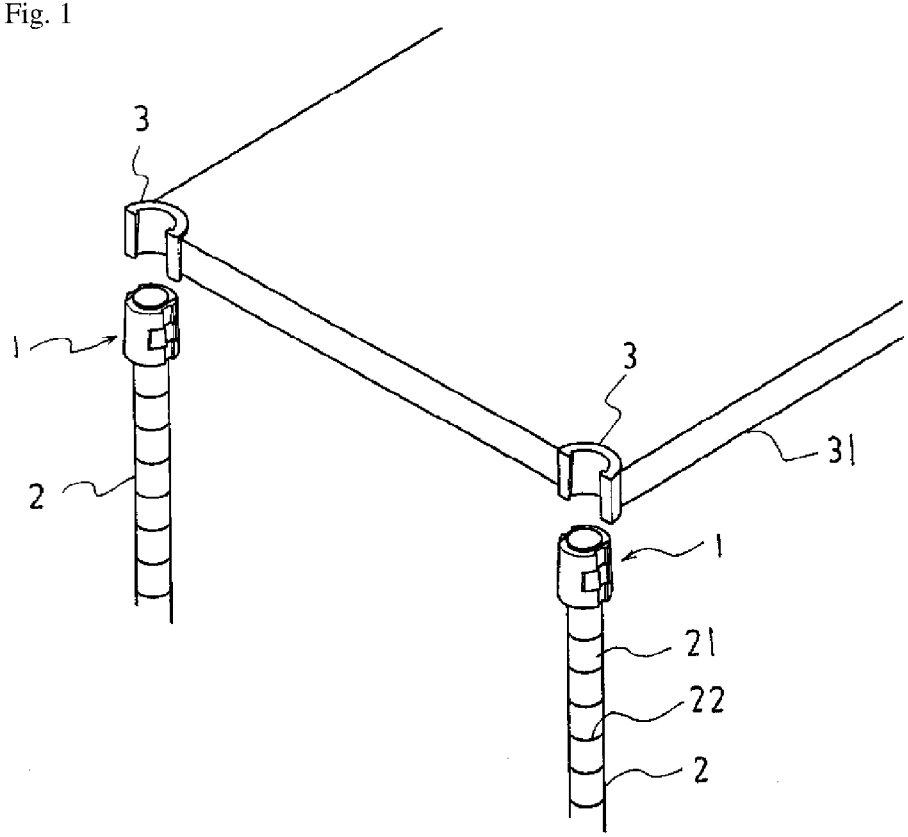
FIG. 1 is a perspective view illustrating a fitting state of a coupling member according to an embodiment of the invention.
Figure 19:
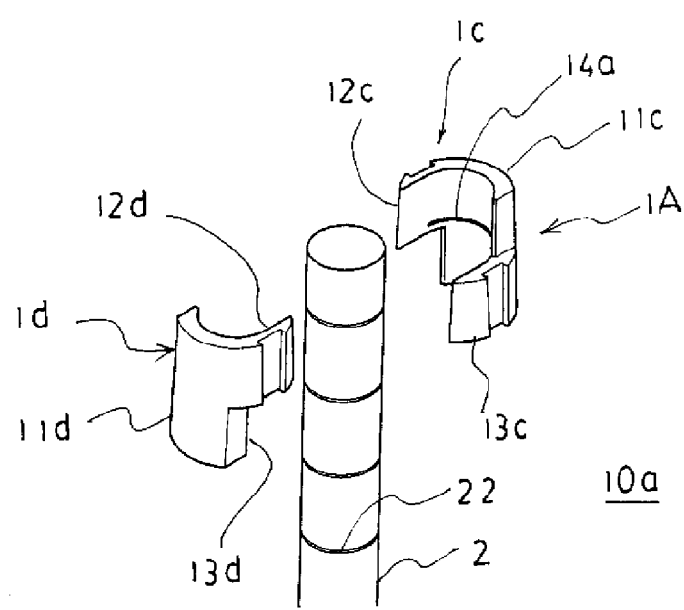
FIG. 19 is an exploded perspective view illustrating another coupling member.

An assembly shelf according to a second embodiment of the invention is described below with reference to FIG. 19. In FIG. 19, the same elements as those illustrated in FIGS. 1 and 2 are indicated by identical signs, and description thereof is omitted. The following description mainly focuses on the differences from the assembly shelf 10. An assembly shelf 10a according to the second embodiment mainly differs from the assembly shelf 10 as to the shape of the arm section of a coupling member 1A.

The coupling member 1A of the assembly shelf 10a includes a member 1c (one member) and a member 1d (the other member), the member 1c including a main body 11c that has a concave inner circumferential surface having a shape that corresponds to the shape of the side surface of the post 2, an arm section 12c that extends in the diametrical direction (inner side) of the post 2 from the upper half of one side (i.e., the back side when viewed from the front side) of the main body 11c, and an arm section 13c that extends in the diametrical direction (inner side) of the post 2 from the lower half of the other side (i.e., the front side when viewed from the front side) of the main body 11c, and the member 1d including a main body 11d that has a concave inner circumferential surface having a shape that corresponds to the shape of the side surface of the post 2, an arm section 13d that extends in the diametrical direction (inner side) of the post 2 from the lower half of one side (i.e., the back side when viewed from the front side) of the main body 11d, and an arm section 12d that extends in the diametrical direction (inner side) of the post 2 from the upper half of the other side (i.e., the front side when viewed from the front side) of the main body 11d.

When the coupling member 1A is fitted to the post 2, the arm section 13d of the member 1d is positioned under the arm section 12c of the member 1c, and the arm section 13c of the member 1c is positioned under the arm section 12d of the member 1d.

The fitting structure of the assembly shelf 10a formed by the coupling member 1A, the post 2, and the shelf board member 31 achieves the same effects as those achieved by the fitting structure of the assembly shelf 10. The assembly shelf 10a enables a middle shelf board removal operation in the same manner as the assembly shelf 10. Another assembly shelf can be coupled to the assembly shelf 10a in the lateral direction.

Note that the coupling member may be configured so that three arm sections of one member and three arm sections of the other member may be alternately disposed when the coupling member is fitted to the post, for example, instead of employing the configuration according to the first embodiment (i.e., one arm section of one member and two arm sections of the other member are alternately disposed) or the configuration according to the second embodiment (i.e., one arm section of one member and one arm section of the other member are disposed side by side).

Figure 20:
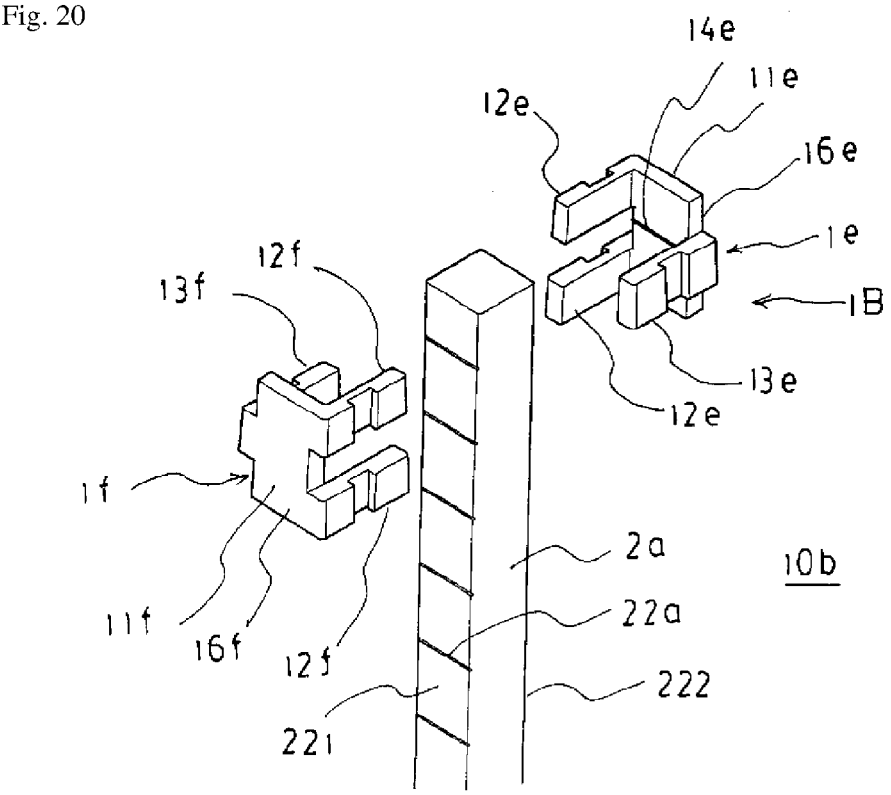
FIG. 20 is an exploded perspective view illustrating another coupling member.
Figure 21:
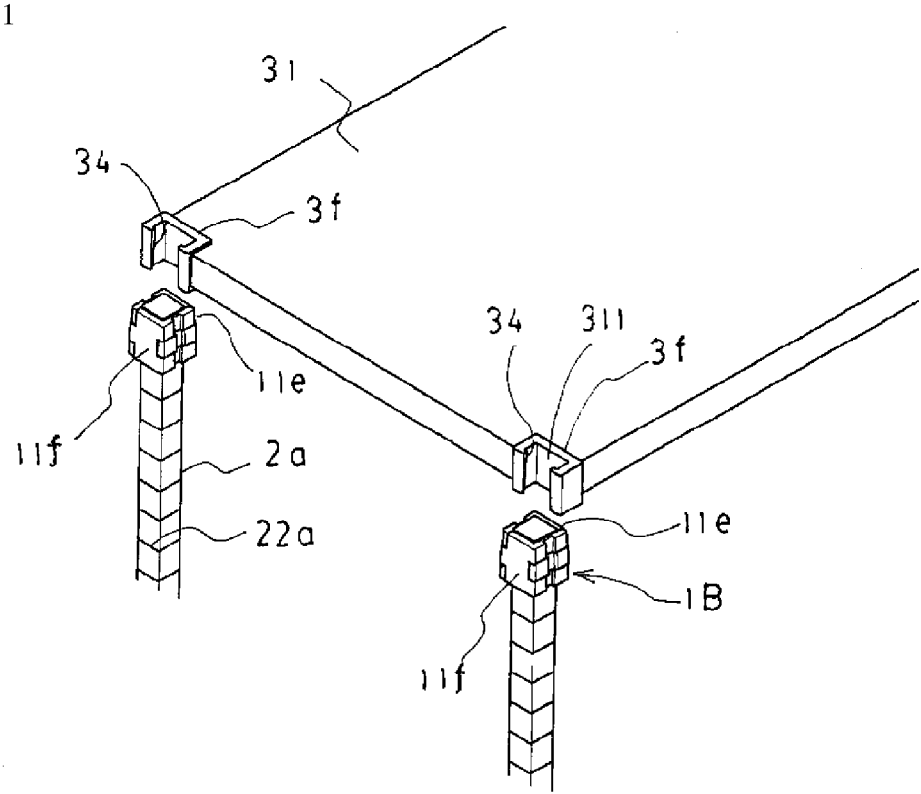
FIG. 21 is a perspective view illustrating a state in which the coupling member illustrated in FIG. 20 is fitted.

An assembly shelf according to a third embodiment of the invention is described below with reference to FIGS. 20 and 21. In FIGS. 20 and 21, the same elements as those illustrated in FIGS. 1 and 2 are indicated by identical signs, and description thereof is omitted. The following description mainly focuses on the differences from the assembly shelf 10. An assembly shelf 10b according to the third embodiment mainly differs from the assembly shelf 10 as to the shape of a post 2a, the shape of a locking groove 22a, the shape of a coupling member 1B, and the shape of the third engagement section of the shelf board member.

The post 2a of the assembly shelf 10b is in the shape of a quadrangular prism having a quadrangular cross section. The locking groove 22a is formed in a left side 221 and a right side 222 of the post 2a in the shape of a quadrangular prism (i.e., is not fainted in the front side and the back side of the post 2a).

A main body 11e (11f) includes a first tapered section 16e (16f) that is in the shape of a planar plate that has a given height and a given width, and has an outer circumferential surface that has a given width and a given height and slopes outward in the downward direction. The given width is the same as the width of the post 2a. Therefore, the coupling member 1B can be fitted to the post 2a without forming a clearance. An elongated protrusion 14e that engages the locking groove 22a of the post 2a and extends in the horizontal direction is formed on the back side of the main body 11e

(11*f*). This ensures that the elongated protrusion 14*e* reliably engages the locking groove 22*a* of the post 2*a*.

A third engagement section 3*f* of the shelf board member 31 has a hollow section 311 that has a volume that accommodates about half of the coupling member 1B in the longitudinal direction of the shelf board member. Therefore, the third engagement section 3*f* can be fitted to the coupling member 1B without forming a clearance.

The fitting structure of the assembly shelf 10*b* formed by the coupling member 1B, the post 2*a*, and the shelf board member 31 achieves the same effects as those achieved by the fitting structure of the assembly shelf 10. The assembly shelf 10*b* enables a middle shelf board removal operation in the same manner as the assembly shelf 10. Another assembly shelf can be coupled to the assembly shelf 10*b* in the lateral direction.

Figure 22:
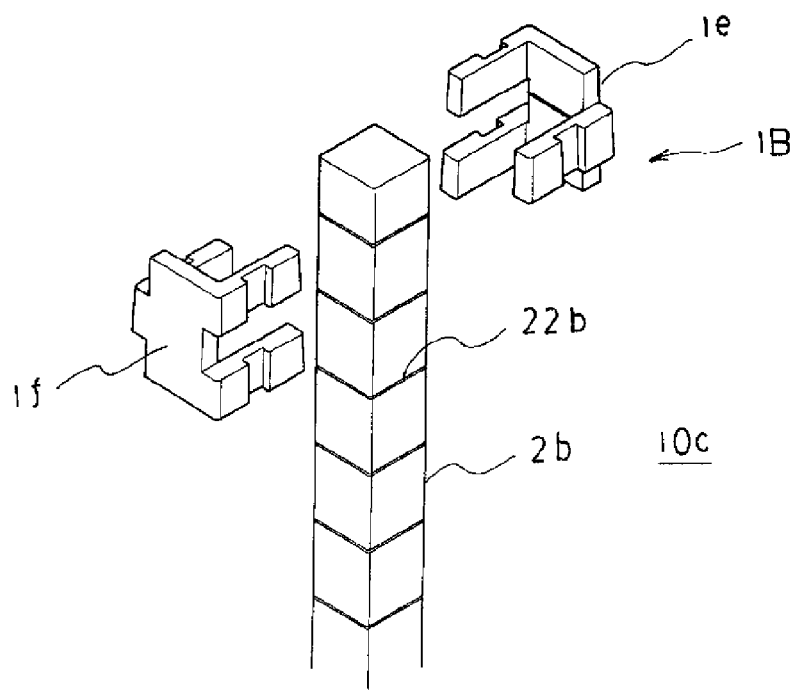
FIG. 22 is a perspective view illustrating another coupling member.

An assembly shelf according to a fourth embodiment of the invention is described below with reference to FIG. 22. In FIG. 22, the same elements as those illustrated in FIG. 20 are indicated by identical signs, and description thereof is omitted. The following description mainly focuses on the differences from the assembly shelf 10*b*. An assembly shelf 10*c* according to the fourth embodiment mainly differs from the assembly shelf 10*b* as to the shape of a locking groove 22*b*.

In the assembly shelf 10*c*, the locking groove 22*b* is formed in each side of a post 2*b* in the shape of a quadrangular prism.

The fitting structure of the assembly shelf 10*c* formed by the coupling member 1B, the post 2*b*, and the shelf board member 31 achieves the same effects as those achieved by the fitting structure of the assembly shelf 10*b*. The assembly shelf 10*c* enables a middle shelf board removal operation in the same manner as the assembly shelf 10*b*. Another assembly shelf can be coupled to the assembly shelf 10*c* in the lateral direction.

Figure 23:
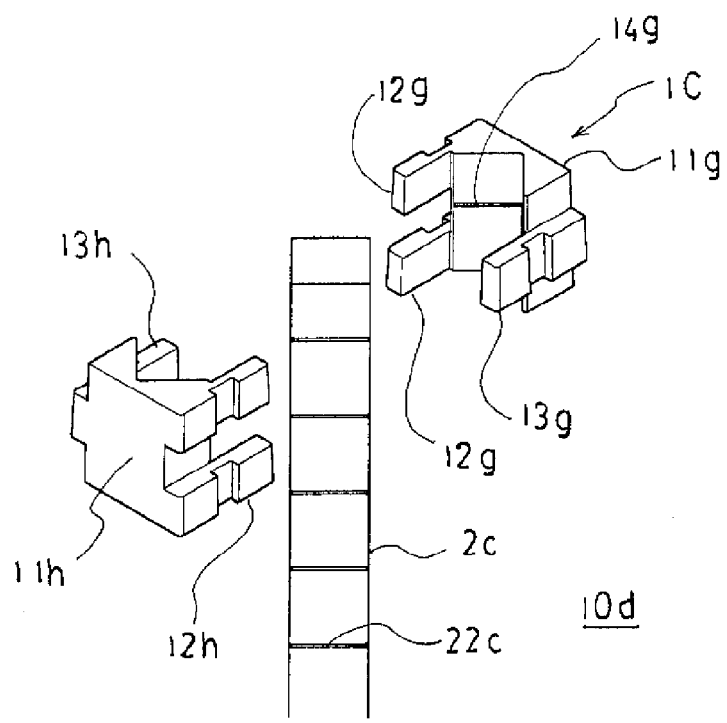
FIG. 23 is a perspective view illustrating another coupling member.
Figure 24:
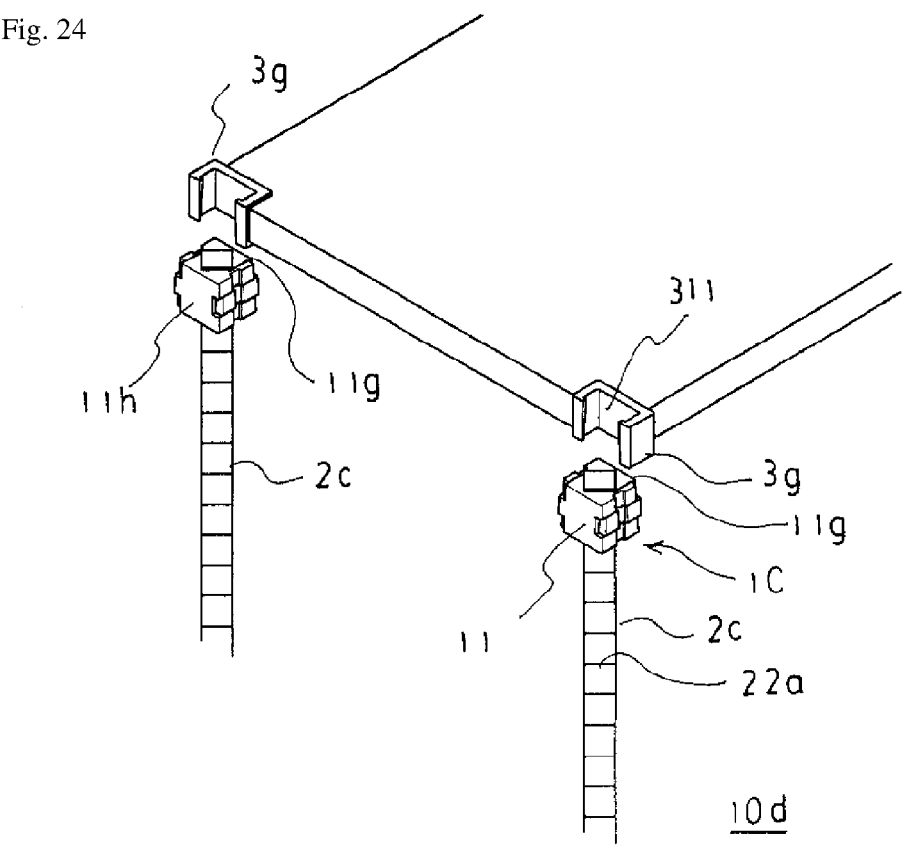
FIG. 24 is a perspective view illustrating a state in which the coupling member illustrated in FIG. 23 is fitted.

An assembly shelf according to a fifth embodiment of the invention is described below with reference to FIGS. 23 and 24. In FIGS. 23 and 24, the same elements as those illustrated in FIGS. 20 and 21 are indicated by identical signs, and description thereof is omitted. The following description mainly focuses on the differences from the assembly shelf 10*b*. An assembly shelf 10*d* according to the fifth embodiment mainly differs from the assembly shelf 10*b* as to the shape of a post 2*c*, the shape of a coupling member 1C, and the shape of the third engagement section of the shelf board member.

The post 2*c* of the assembly shelf 10*d* is in the shape of a quadrangular prism having a rhombic cross section. A locking groove 22*c* is formed in each side of a post 2*c* in the shape of a quadrangular prism.

A main body 11*g* (11*h*) of the assembly shelf 10*d* includes a first tapered section that has a given height and a given width, has a hollow section having a triangular cross-sectional shape that corresponds to the external shape of the post 2*c*, and has an outer circumferential surface that has a given width and a given height and slopes outward in the downward direction. The given width is the same as the width of the post 2*c*. Therefore, the coupling member 1C can be fitted to the post 2*c* without forming a clearance. An elongated protrusion 14*g* that engages the locking groove 22*c* of the post 2*c* and extends in the horizontal direction is formed on the back side of the main body 11*g* (11*h*). Therefore, the elongated protrusion 14*g* reliably engages the locking groove 22*c* of the post 2*c*.

A third engagement section 3*g* of the shelf board member 31 has a hollow section 311 that has a volume that accommodates about half of the coupling member 1C in the longitudinal direction of the shelf board member. Therefore, the third engagement section 3*g* can be fitted to the coupling member 1C without forming a clearance.

The fitting structure of the assembly shelf 10*d* formed by the coupling member 1C, the post 2*c*, and the shelf board member 31 achieves the same effects as those achieved by the fitting structure of the assembly shelf 10*b*. The assembly shelf 10*d* enables a middle shelf board removal operation in the same manner as the assembly shelf 10*b*. Another assembly shelf can be coupled to the assembly shelf 10*d* in the lateral direction.

INDUSTRIAL APPLICABILITY

The assembly shelves according to the embodiments of the invention may be used as a storage shelf in an office, home, warehouse, store, or the like, or may be used as a display shelf in a store, and implements easy assembly and disassembly.

REFERENCE SIGNS LIST

1 Coupling member
1*a* One member
1*b* The other member
2, 2*a*, 2*b*, 2*c* Post
3 Third engagement section
10, 10*a*, 10*b*, 10*c*, 10*d*, 20 Assembly shelf
11*a* (11*b*) Main body of coupling member
12*a* (12*b*) Arm section
13*a* (13*b*) Arm section
14*a* (14*b*) Protrusion
16*a* (16*b*) First tapered section
17*a* (17*b*) Second tapered section
322 Third tapered section
321 Fourth tapered section
22, 22*a*, 22*b*, 22*c* Locking groove
31 Shelf board member

The invention claimed is:
1. A coupling member that is fitted to a post, and supports one shelf board member within a half area of the coupling member in a diametrical direction when viewed from a front side, the coupling member comprising:

two members that are fitted to each other to hold the post from either side, each of the two members including a first tapered section on an outer circumferential surface that gradually increases in diameter in a downward direction, and a second tapered section that gradually slopes inward in the downward direction, the first tapered section being disposed on a main body of each of the two members, the second tapered section being disposed on arm sections extending laterally in the diametrical direction from the main body of each of the two members, each of the arm sections having an outwardly facing surface, said arm sections having a downwardly extending groove on said outer surface, said groove having two groove edges, wherein one groove edge of the said groove edges comprises a portion of the second tapered section, the coupling member being fitted to the post so that the first tapered sections of the two members are respectively positioned on a right outer circumferential surface and a left outer circumferential surface when viewed from the front side, and the second tapered sections of the two members are positioned on the front side and a back side when viewed from the front side, and the first tapered section of only one member among the two members and the second tapered section of another member among the two members being disposed within the half area of the coupling member when the coupling member is fitted to the post and is supporting the one shelf member.

2. The coupling member according to claim 1, wherein the main body of each of the two members has an inner circumferential surface having a shape that corresponds to a shape of a side surface of the post, and the first tapered section is formed by an outer circumferential surface of the main body.

3. The coupling member according to claim 1,
wherein the arm section or arm sections of the one member and the arm section or arm sections of the other member are alternately disposed when the coupling member is fitted to the post.

4. The coupling member according to claim 1, further comprising an elongated protrusion or a protrusion that is formed on the inner circumferential surface of the main body, and engages the post.

5. The coupling member according to claim 1, the coupling member being formed of a metal, a resin, or a composite thereof.

6. The coupling member according to claim 1, wherein the two members have an identical shape and identical dimensions.

7. An assembly shelf comprising the coupling member according to claim 1.

8. An assembly shelf comprising:
four posts on which the coupling member according to claim 1 is respectively secured, a plurality of locking grooves or locking holes being formed in each of the four posts in a longitudinal direction at regular or irregular intervals; and
a shelf board member, third engagement sections being respectively formed at four corners of the shelf board member, each of the third engagement sections including a third tapered section that comes in contact with the first tapered section of the one member of the coupling member, and a fourth tapered section that comes in contact with the second tapered section of the other member of the coupling member,
the shelf board member being secured by fitting the third engagement section to the coupling member, and the shelf board member being disposed between an axial center of one post among the four posts and an axial center of another post among the four posts when viewed from a front side.

9. The assembly shelf according to claim 8, wherein the plurality of locking grooves are annular or partially annular.

10. The assembly shelf according to claim 8, wherein each of the third engagement sections includes an engagement main body that has an inner circumferential surface having a shape that corresponds to a shape of a side surface of the coupling member, and a flange that extends inward from each end of the engagement main body.

11. The assembly shelf according to claim 8, wherein the third tapered section has an inner circumferential shape that corresponds to a shape of a side surface of the coupling member, and corresponds to the first tapered section of the one member.

12. The assembly shelf according to claim 8, wherein the fourth tapered section is formed on a side of a flange of the third engagement section that faces the third tapered section, and corresponds to the second tapered section of the other member.

13. The assembly shelf according to claim 8, wherein the third tapered section of the shelf board member presses the one member of the coupling member against the post, and the fourth tapered section of the shelf board member presses the other member of the coupling member against the one member, so that the two members of the coupling member hold the post.

14. An assembly shelf comprising:
four posts on which the coupling member according to claim 2 is respectively secured, a plurality of locking grooves or locking holes being formed in each of the four posts in a longitudinal direction at regular or irregular intervals; and
a shelf board member, third engagement sections being respectively formed at four corners of the shelf board member, each of the third engagement sections including a third tapered section that comes in contact with the first tapered section of the one member of the coupling member, and a fourth tapered section that comes in contact with the second tapered section of the other member of the coupling member,
the shelf board member being secured by fitting the third engagement section to the coupling member, and the shelf board member being disposed between an axial center of one post among the four posts and an axial center of another post among the four posts when viewed from a front side.

15. An assembly shelf comprising:
four posts on which the coupling member according to claim 3 is respectively secured, a plurality of locking grooves or locking holes being formed in each of the four posts in a longitudinal direction at regular or irregular intervals; and
a shelf board member, third engagement sections being respectively formed at four corners of the shelf board member, each of the third engagement sections including a third tapered section that comes in contact with the first tapered section of the one member of the coupling member, and a fourth tapered section that comes in contact with the second tapered section of the other member of the coupling member,
the shelf board member being secured by fitting the third engagement section to the coupling member, and the shelf board member being disposed between an axial center of one post among the four posts and an axial center of another post among the four posts when viewed from a front side.

16. An assembly shelf comprising:
four posts on which the coupling member according to claim 4 is respectively secured, a plurality of locking grooves or locking holes being formed in each of the four posts in a longitudinal direction at regular or irregular intervals; and a shelf board member, third engagement sections being respectively formed at four corners of the shelf board member, each of the third engagement sections including a third tapered section that comes in contact with the first tapered section of the one member of the coupling member, and a fourth tapered section that comes in contact with the second tapered section of the other member of the coupling member,
the shelf board member being secured by fitting the third engagement section to the coupling member, and the shelf board member being disposed between an axial center of one post among the four posts and an axial center of another post among the four posts when viewed from a front side.

17. An assembly shelf comprising:
four posts on which the coupling member according to claim 5 is respectively secured, a plurality of locking grooves or locking holes being formed in each of the four posts in a longitudinal direction at regular or irregular intervals; and a shelf board member, third engagement sections being respectively formed at four corners of the shelf board member, each of the third engagement sections including a third tapered section that comes in contact with the first tapered section of the one member of the coupling member, and a fourth tapered section that comes in contact with the second tapered section of the other member of the coupling member, the shelf board member being secured by fitting the third engagement section to the coupling member, and the shelf board member being disposed between an axial center of one post among the four posts and an axial center of another post among the four posts when viewed from a front side.

18. An assembly shelf comprising:

four posts on which the coupling member according to claim 6 is respectively secured, a plurality of locking grooves or locking holes being formed in each of the four posts in a longitudinal direction at regular or irregular intervals; and a shelf board member, third engagement sections being respectively formed at four corners of the shelf board member, each of the third engagement sections including a third tapered section that comes in contact with the first tapered section of the one member of the coupling member, and a fourth tapered section that comes in contact with the second tapered section of the other member of the coupling member, the shelf board member being secured by fitting the third engagement section to the coupling member, and the shelf board member being disposed between an axial center of one post among the four posts and an axial center of another post among the four posts when viewed from a front side.

19. An assembly shelf comprising:

four posts on which the coupling member according to claim 1 is respectively secured, a plurality of locking grooves or locking holes being formed in each of the four posts in a longitudinal direction at regular or irregular intervals; and a shelf board member, third engagement sections being respectively formed at four corners of the shelf board member, each of the third engagement sections including a third tapered section that comes in contact with the first tapered section of the one member of the coupling member, and a fourth tapered section that comes in contact with the second tapered section of the other member of the coupling member, the shelf board member being secured by fitting the third engagement section to the coupling member, and the shelf board member being disposed between an axial center of one post among the four posts and an axial center of another post among the four posts when viewed from a front side.

* * * * *